March 6, 1945.　　　　　E. A. JONES　　　　　2,370,863
GRIDDLE CONSTRUCTION
Filed Aug. 29, 1941　　　　　4 Sheets-Sheet 2
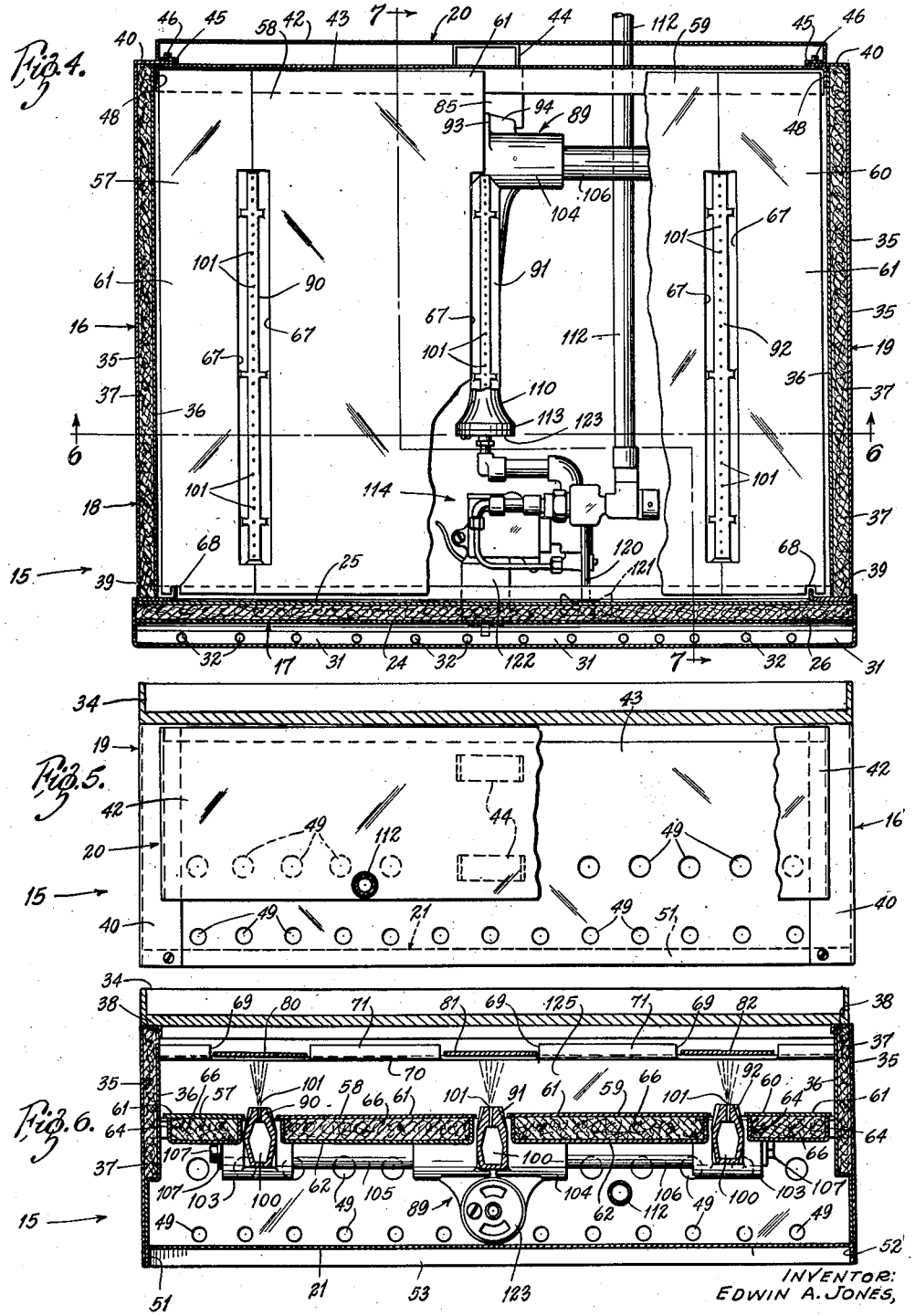
INVENTOR:
EDWIN A. JONES,
By Kingsland, Rogers & Ezell
ATTORNEYS March 6, 1945.  E. A. JONES  2,370,863
GRIDDLE CONSTRUCTION
Filed Aug. 29, 1941   4 Sheets-Sheet 3
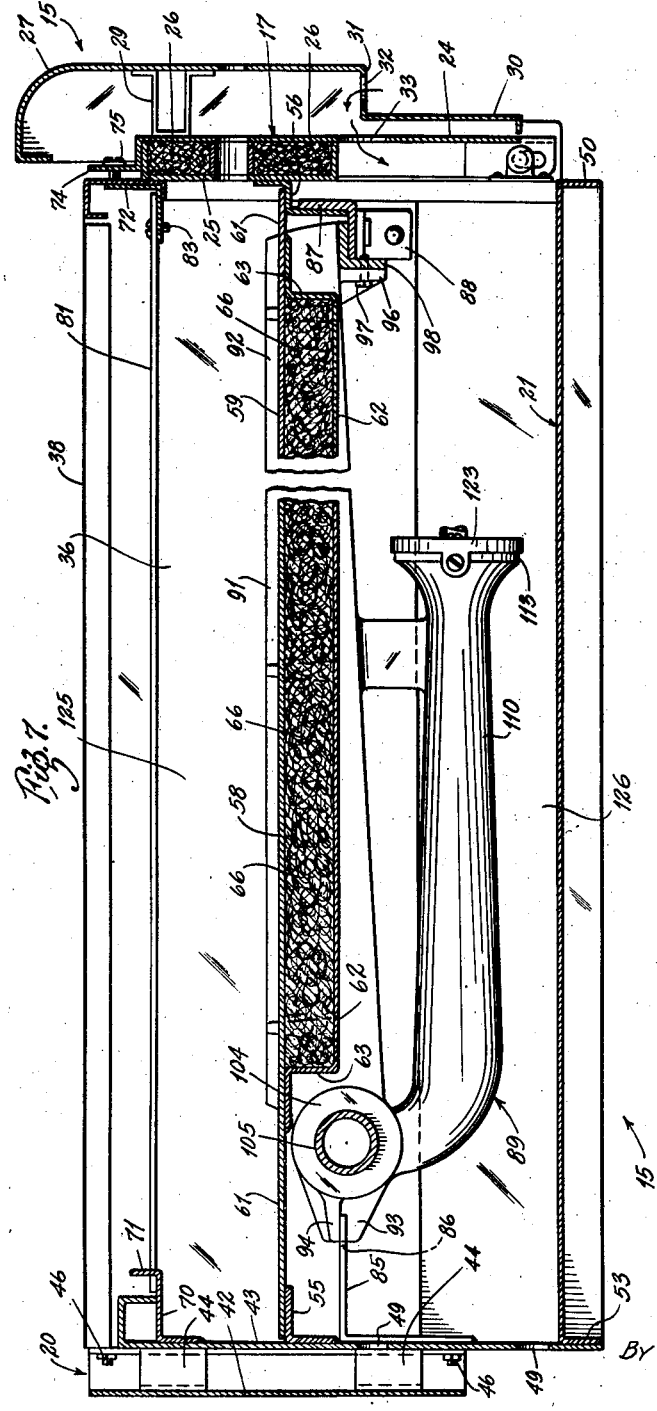
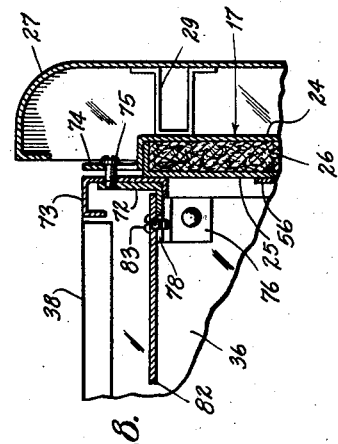
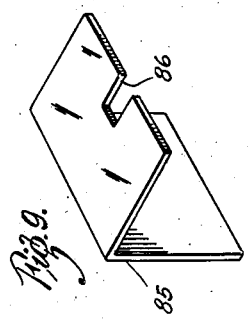
INVENTOR:
EDWIN A. JONES,
BY Kingsland, Rogers & Ezell
ATTORNEYS.

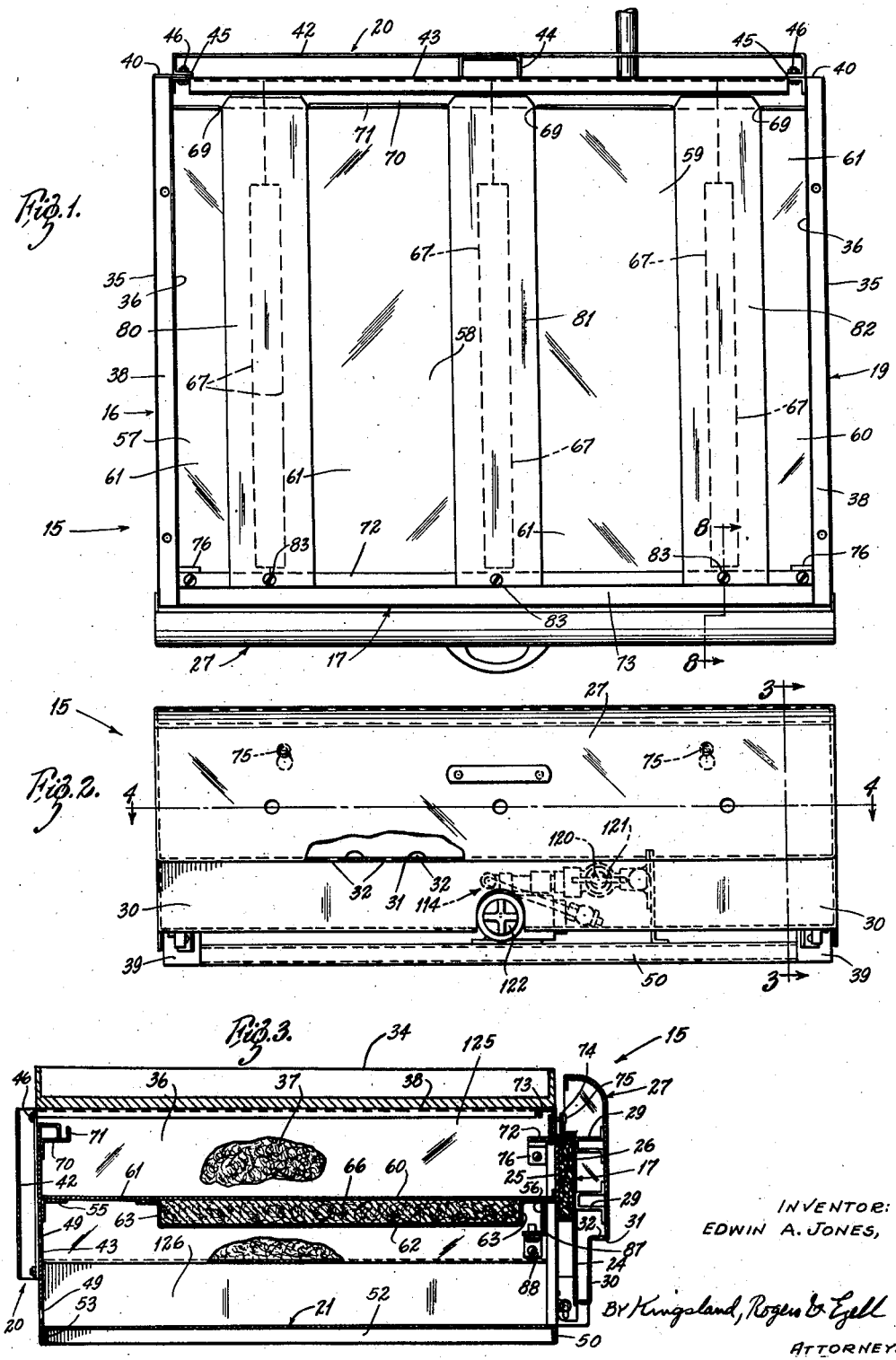

March 6, 1945.  E. A. JONES  2,370,863
GRIDDLE CONSTRUCTION
Filed Aug. 29, 1941  4 Sheets-Sheet 4
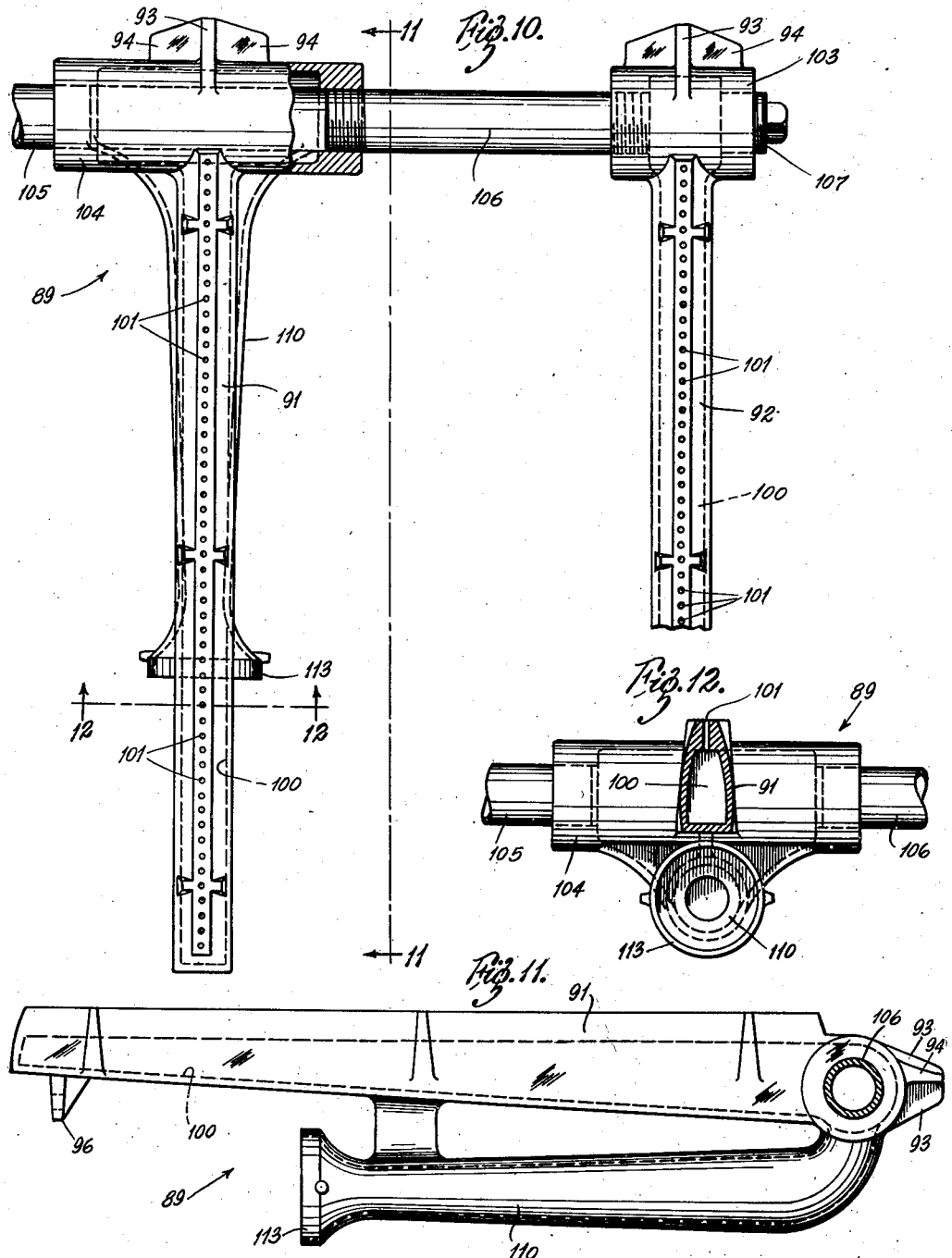
INVENTOR:
EDWIN A. JONES,
BY Kingsland, Rogers & Ezell
ATTORNEYS Patented Mar. 6, 1945

2,370,863

UNITED STATES PATENT OFFICE 2,370,863

GRIDDLE CONSTRUCTION

Edwin A. Jones, Webster Groves, Mo., assignor to Majestic Manufacturing Company, St. Louis, Mo., a corporation of Missouri Application August 29, 1941, Serial No. 408,704

8 Claims. (Cl. 126—41)

The present invention relates generally to cooking apparatus and more particularly to griddles and the like.

It is an object of the present invention to provide a griddle incorporating novel heat supply and heat distributing construction.

Another object is to provide a novel griddle including a construction whereby the applied heat is retained within an area adjacent to the cooking plate and in which no cold drafts and the like are permitted to influence the applied heat.

Another object is to provide a novel heat distributing and cold draft preventing construction which finds particular adaptation to a griddle or the like.

Another object is to provide a novel griddle incorporating a gas supply construction having a plurality of outlets and a single supply and control.

Another object is to provide a novel griddle including control mechanism below heat supplying units.

Another object is to provide a novel gas-supply construction which finds particular adaptation to griddles and similar construction.

Other objects are to provide a heat distributing and control construction and a gas-supply construction which can be readily manufactured, which are simple in ultimate embodiment and which fulfill all of the advantages sought therefor.

Still other objects and advantages are apparent from the following description taken in conjunction with the accompanying drawings, in which:

Fig. 1 is a plan view of a griddle embodying the concepts of the present invention, the griddle plate being omitted for purpose of clarity of illustration;

Fig. 2 is a front view of the griddle shown in Fig. 1, certain parts being broken away for clarity of illustration;

Fig. 3 is a section on the line 3—3 of Fig. 2, the griddle plate being shown in dotted lines;

Fig. 4 is a section on the line 4—4 of Fig. 2;

Fig. 5 is a rear elevation of the griddle shown in Fig. 1;

Fig. 6 is a section on the line 6—6 of Fig. 4;

Fig. 7 is an enlarged section on the line 7—7 of Fig. 4;

Fig. 8 is an enlarged section on the line 8—8 of Fig. 1;

Fig. 9 is a perspective view of a bracket;

Fig. 10 is a top view of a portion of the gas-supply construction;

Fig. 11 is a section on the line 11—11 of Fig. 10; and

Fig. 12 is a section on the line 12—12 of Fig. 10

Referring to the drawings more particularly by reference numerals, 15 indicates generally a griddle constructed in accordance with the teachings of the present invention. The griddle 15 includes a casing 16 which broadly comprises a front wall 17 (Figs. 3 and 4), side walls 18 and 19, a rear wall 20 and a bottom 21.

The front wall 17 (Figs. 3 and 7) includes an outer plate 24 and an inner plate 25 of U-cross-section. Between the plates 24 and 25 is insulating material 26. A face plate 27 of the cross-section shown is secured to the ends of the plates 24 and 25 by bolts, welding, or the like, completing the enclosing of the insulation 26. Spacing members 29 are disposed between the face plate 27 and the plate 24. The face plate 27 includes a downwardly extending apron 30 which is inwardly off-set by a portion 31, which includes a plurality of air holes 32. Air holes 33 are in the plate 24 (Fig. 7).

Each of the side walls 18 and 19 (Figs. 4 and 6) includes an outer plate 35 and an inner plate 36, the latter being off-set from the former for a portion thereof to provide a space which receives insulating material 37. Each plate 35 includes an upper flange 38 which extends over the upper end of the respective plate 36 completing the enclosing of the insulation 37. Each plate 35 also includes a forward end flange 39 and a rearward end flange 40.

The rear wall 20 (Figs. 4 and 7) includes an outer plate 42 and an inner plate 43 between which are spacers 44 of U-cross-section. The plate 42 has a return flange 45 at each end, which is secured by nuts and bolts 46, or the like, to the ends of the plate 43 and to the flanges 40. The plate 43 includes flanges 48 which are secured by bolts, or the like, to the plates 36. Spaced air holes 49 are located in the plate 43.

The bottom 21 comprises a plate having a front flange 50, side flanges 51 and 52, and a rear flange 53 (Figs. 6 and 7). The side flanges 51 and 52 are secured by bolts, or the like, to the outer plates 35 of the side walls 18 and 19. The rear flange 53 is secured by bolts, or the like, to the plate 43 of the rear wall 20. The lower ends of the forward flanges 39 are secured by bolts, or the like, to the front flange 50.

A bracket member 55 (Fig. 7) is secured by welding, or the like, to the inner plate 43 of the rear wall 20 and extends the full width of the plate 43. A bracket member 56 of reverse bend cross-section is secured by welding, or the like, to the inner plate 25 of the front wall 17 and extends across the full width of the plate 25. Four heat radiating insulated units 57, 58, 59 and 60 (Figs. 4 and 6) are supported on the brackets 55 and 56. The unit 60 includes a flat top plate 61 (Fig. 3) and a bottom plate 62 of lesser overall dimensions which is spaced from the plate 61 by end walls 63 and side walls 64, being secured to the aforesaid plate 61 by welding or the like. Insulating material 66 is disposed between the plates 61 and 62. The plate 61 is cut away at 67 for a purpose to be described. The plate 61 also includes a notch 68 at the forward edge, into which a return edge of the flange 39 extends. Each of the units 57, 58 and 59 is substantially the same as the unit 60, and, therefore, detailed description of each is unnecessary. However, the upper plate 61 of each of the interior units 58 and 59 has a cut away portion 67 at each side edge. It is clear from Fig. 4 that the adjacent edges of the plates 61 of units 57, 58, 59 and 60 are in contiguous relationship along the segments not affected by the cut away portions 67.

A return bracket member 70 is secured to the inner plate 43 of the rear wall 20 above the bracket member 55 and extends across the full width of the plate 43. The bracket member 70 includes an up-turned portion 71 which is cut away at spaced points 69 (Fig. 1). An elongated bracket member 72 of right angle cross section, and an elongated bracket member 73 of the cross section shown are secured together and to an upwardly extending portion 74 of the outer plate 24 of the front wall 17 by screws 75 (Figs. 7 and 8). The member 72 is also supported at its ends by angle brackets 76, bolted or otherwise secured to the side walls 18 and 19. The member 72 has spaced notches 78 in its horizontal portion (Fig. 8), said notches 78 in opposed relationship to substantially the center points of the cut away portions 69 of the bracket member 70. Elongated plates 80, 81 and 82 (Fig. 1) have their rearwardly disposed ends extending through the cut away portions 69 of the bracket member 70 to rest upon the bracket member 70, and include at the forward end screws 83 which are disposed in the notches 78, the forward ends of the plates 80, 81 and 82 resting on the horizontal portion of the bracket member 72. Each of the plates 80, 81 and 82 is disposed over an opening defined by adjacent cut away portions 67 of contiguous units as 57, 58, 59 and 60.

It will also be observed that the bracket member 73 cooperates with the flanges 38 to provide a support for a griddle plate 34.

Three spaced angle brackets 85 are secured to the plate 43 of the rear wall 20, beneath the angle member 55, each having in its horizontal portion a notch 86. A bracket member 87 is secured to the deep inner portion of the return bracket member 56, and extends across the width of the front wall 17 to find support upon angle brackets 88 bolted or otherwise secured to the side walls 18 and 19. A multiple outlet burner 89 has elongated burner outlet members 90, 91 and 92 supported by the angle brackets 85 and the bracket member 87. Each burner member 90, 91 and 92 includes a vertical rear portion 93 (Fig. 7) and a horizontal portion 94 at each side thereof, the rear portion 93 extending through a notch 86 and the horizontal portions 94 resting on the horizontal portion of a bracket 85. Each burner member 90, 91 and 92 also includes at each forward end a depending portion 96 which is secured by a bolt 97 to an angle bracket 98, which, in turn, rests on the horizontal portion of the bracket member 87. Each burner member 90, 91 and 92 extends through an opening defined by adjacent cut away portions 67 of the units 57, 58, 59 and 60 (Figs. 4 and 6).

Each burner member 90, 91 and 92 has an elongated chamber 100 from which the gas ports 101 lead (Fig. 6). Each of the burner members 90 and 92 includes a hub 103 (Figs. 6 and 10), and the burner member 91 a hub 104. A gas pipe segment 105 connects the hub 103 of the burner member 90 and the hub 104 of burner member 91. Similarly, a gas pipe segment 106 connects the hub 104 of the burner member 91 and the hub 103 of the burner member 92. The free end of each hub 103 is closed by a suitable plug 107. A single fuel receiving and air injecting Venturi tube 110 is disposed beneath the burner member 91 and communicates at its rearward end with the hub 104 thereof (Fig. 11).

A gas supply pipe 112 extends through the rear wall 20 to a position under the forward end 113 of the tube 110. The supply pipe 112 communicates with a thermostat control unit 114, which is, in turn, connected to the forward end 113 of the tube 110. A cut off valve (not shown) is connected to a shaft 120 manually actuable by a knob 121. The unit 114 includes an automatic thermal valve 122 which extends through the front wall 17 and which can be manually set to function at a desired temperature. An adjustable air inlet 123 is located at the forward end 113 of the tube 110.

A heat chamber 125 is formed above the units 57, 58, 59 and 60 and an air chamber therebelow. The thermostat control unit 114 is within the air chamber 126.

*Operation*

The construction of the several elements of the present griddle 15, particularly those elements which carry out the teachings of the present invention, is clear from the foregoing description taken with the accompanying drawings.

However, attention is directed to the fact that the burner members 90, 91 and 92 substantially occupy the spaces between contiguous units 57, 58, 59 and 60 formed by opposed cut away portions 67 (Figs. 4 and 6). Hence, the heat chamber 125 is formed, the bottom of which is defined by the units 57, 58, 59 and 60 with the burner members 90, 91 and 92 and the top of which is defined by the lower heat receiving surface of the griddle plate 34. No substantial amount of uncontrolled cold air can pass into this chamber 125.

Each of the units 57, 58, 59 and 60 includes the insulating material 66 throughout the major portion thereof both to prevent the escape of heat and to keep out undesired cold air.

Contributing towards even distribution of the heat supplied over the heat receiving surface of the griddle plate 34 are the plates 80, 81 and 82, which are disposed above the ports 101 of the burner members 90, 91 and 92 (Figs. 1 and 6). The flames from the ports 101 are directed toward the lower surface of the plates 80, 81 and 82 so there is no direct radiation from the flames to the heat receiving surface of the griddle plate 34. This combined with the aforesaid functions of the units 57, 58, 59 and 60 eliminates "hot spots" in the griddle plate 34 and gives an even temperature to the whole area thereof.

Hence, the heat applied to the heat receiving surface of the griddle plate 34 is evenly distributed, and there is no change in the temperature of the heat supplied since disturbing cold air currents are eliminated.

The novel burner construction described and shown contributes toward control of the heat supply and to the even temperature of the griddle plate 34. Each of the burners 90, 91 and 92 receives the same mixture of fuel under the same pressure and, therefore, the flame of each burner member 90, 91 and 92 is substantially the same. The use of a single Venturi tube 110 together with the single thermostat control 114 provides simplicity and consistency of supplied heat. The human element is thereby eliminated.

In view of the presence of the air chamber 126, the thermostat control unit 114 is disposed directly beneath the heat chamber 125. More air than is required for combustion passes through the front air holes 32, 33 and the rear air holes 49, keeping the temperature of the air chamber 126 sufficiently low for the control unit 114. This novel construction saves space and lends superior control.

It is manifest that there has been provided a novel combination of elements to obtain an evenly heated griddle plate. It is also manifest that the several sub-combinations thereof are novel with the applicant. Palpably, the novel combination and sub-combinations shown and described fulfill all of the objects and advantages sought therefor.

It is to be understood that the elements shown may be changed within the scope of the invention as to configuration, material, and the like. For example, the thermostat control unit 14 may be omitted.

It is also to be understood that the foregoing description and the accompanying drawings have been given by way of illustration and example and not for purpose of limitation, the invention being defined by the claims which follow.

I claim:

1. Cooking apparatus comprising a casing, a heat receiving member supported adjacent the top of the casing, a plurality of burner members disposed within the casing and beneath and spaced from the heat receiving member, means disposed adjacent to the burner members providing with the burner members means closing off the space thereabove from the space therebeneath and forming the lower boundary of a heat chamber, said members adjacent the burner members including heat radiating surfaces, and means disposed between the burner members and the heat receiving member to receive the direct effect of flames from the burner members, said last means and the heat radiating surfaces of the means disposed adjacent the burner members combining to evenly distribute heat to the heat receiving member.

2. Cooking apparatus comprising a casing, a heat receiving member supported adjacent the top of the casing, a plurality of burner members disposed within the casing and beneath and spaced from the heat receiving member, said burner members being controlled by a single unit as to supplied fuel, means disposed adjacent to the burner members providing with the burner members means closing off the space thereabove from the space therebeneath and forming the lower boundary of a heat chamber, said members adjacent the burner members having radiating surfaces and heat receiving plates to receive the direct effect of flames from the burner members, said plates and the heat radiating surfaces of the means disposed adjacent the burner members combining to evenly distribute heat to the heat receiving member.

3. Cooking apparatus comprising a casing, a cooking plate supported adjacent to the top of the casing, burner members in the casing spaced from the plate, insulated units across the casing disposed adjacent the burner members and having openings therein substantially coextensive with the burners, and forming therewith the bottom of a heat chamber, a second chamber below said insulated units and the burner members, and a heat-responsive gas control unit in said second chamber, said second chamber being provided with inlet openings for atmospheric air at one end thereof and so located that air for combustion passes through said second chamber to maintain a relatively low temperature therein and then to said burners.

4. In a device of the kind described, a casing providing front, back, and side walls, a horizontal partition across said casing, said partition having aperture means therein, burner means projecting into said aperture means and substantially closing the same, baffle plate means disposed above the burner means and shaped to receive the direct heat thereof, and a separate imperforate griddle plate disposed above the baffle plate means and partitions, said side, front, and back walls, with said partition and burner means, and said griddle, forming an enclosure comprising a heat chamber, said baffle plate means being of a size substantially smaller than the griddle to provide free spaces around it to the griddle that are offset from the burner means, and thus to provide relatively free flow of air currents within the heating chamber.

5. In a device of the kind described, a casing providing front, back, and side walls, a horizontal partition across said casing, said partition having openings therein, burners projecting into said openings and substantially closing the same, said burners being spaced over the area of said partition, baffle plates disposed above the burners and shaped to receive the direct heat thereof, and a separate imperforate griddle plate disposed above the baffle plates, said side, front, and back walls, with said partition and burners, and said griddle, forming an enclosure comprising a heat chamber, said casing having an air space below said partition, mixing means for the burners disposed in said air space, said mixing means comprising an air and fuel mixer and a manifold leading therefrom to the several burners.

6. In a cooking device, a casing having a front, a rear, and sides, a partition thereacross having spaced slots running transversely thereof, said partition being insulated between said slots, a plurality of elongated burners, one in each slot and substantially filling the same, a plurality of elongated baffle plates, one above each burner and of a size to receive the direct heat thereof and to deflect a part of it, said baffle plates being spaced apart to admit passage of heat around the sides thereof, and an imperforate griddle above the baffle plates extending across the casing.

7. In a cooking device, a casing having front, rear, and side walls, ledges across the front and rear walls, a plurality of partition units of a length to extend from one ledge to the other, said units being supported on the ledges, and having combined widths equal to the space between the side walls, whereby said units may be inserted from above to form a complete partition, at least some of said partitions being cut away to form a plurality of slots extending between the front and rear thereof, a plurality of burners, one in each slot and substantially coextensive therewith, means supporting said burners beneath the units to project into the slots, an imperforate griddle member over the burners, and with the walls of the casing, the partition units, and the burners forming a heating chamber, and means to provide an air flow passage into the chamber.

8. In a cooking device, a casing having front, rear, and side walls, ledges across the front and rear walls, a plurality of partition units of a length to extend from one ledge to the other, said units being supported on said ledges, and having combined widths equal to the space between the side walls, whereby said units may be inserted from above to form a complete partition, at least some of said partitions being cut away to form a plurality of slots extending between the front and rear thereof, a plurality of burners, one in each slot and substantially coextensive therewith, means supporting said burners beneath the units to project into the slots, an imperforate griddle member over the burners, and with the walls of the casing, the partition units, and the burners forming a heating chamber, and means to provide an air flow passage into the chamber, and baffle means comprising plates extending from the front to the rear of the casing, above each burner, below the griddle.

EDWIN A. JONES.